(12) United States Patent
Weinberger et al.

(10) Patent No.: US 9,953,033 B2
(45) Date of Patent: Apr. 24, 2018

(54) WIRELESS CONTENT SYNCHRONIZATION

(71) Applicant: APPLE INC., Cupertino, CA (US)

(72) Inventors: Marc E. Weinberger, San Carlos, CA (US); James H. Callender, San Francisco, CA (US); Nathan de Vries, San Francisco, CA (US); Edward T. Schmidt, Burlingame, CA (US)

(73) Assignee: Apple Inc., Cupertino, CA (US)

( * ) Notice: Subject to any disclaimer, the term of this patent is extended or adjusted under 35 U.S.C. 154(b) by 544 days.

(21) Appl. No.: 14/485,421

(22) Filed: Sep. 12, 2014

(65) Prior Publication Data

US 2015/0347550 A1  Dec. 3, 2015

Related U.S. Application Data

(60) Provisional application No. 62/004,698, filed on May 29, 2014.

(51) Int. Cl.
*G06F 17/30* (2006.01)
*G06F 17/00* (2006.01)

(52) U.S. Cl.
CPC .. *G06F 17/30038* (2013.01); *G06F 17/30174* (2013.01)

(58) Field of Classification Search
CPC .......... G06F 17/3002; G06F 17/30038; G06F 17/30053; G06F 17/30056; G06F 17/3005; G06F 17/30575; G06F 17/30861; G06F 8/70; G06F 9/00; G06F 17/30029; G06F 17/30044; G06F 17/30064; G06F 17/30176; G06F 17/30265; G06F 17/30864; G06Q 10/10; G06Q 30/02; G06Q 30/0207; G06Q 30/0601; G06Q 10/101; G06Q 30/06; G06Q 30/0641; G06Q 30/0609; G06Q 30/0633; G06Q 30/0241

See application file for complete search history.

(56) References Cited

U.S. PATENT DOCUMENTS

| | | | |
|---|---|---|---|
| 6,023,714 A * | 2/2000 | Hill | G06F 17/211 715/235 |
| 2008/0126364 A1* | 5/2008 | Khosravy | H04L 67/1095 |
| 2010/0146133 A1* | 6/2010 | Perrin | H04L 51/24 709/229 |

* cited by examiner

*Primary Examiner* — Yicun Wu
(74) *Attorney, Agent, or Firm* — Kilpatrick Townsend & Stockton LLP

(57) ABSTRACT

Mobile devices that perform synchronization operations are configured to reduce the amount of data that must be synced to perform a media content sync operation over a wireless connection. The sync operation is implemented as a two-phase arrangement, synchronizing first in a metadata sync operation and then in a media content sync operation. The source device transmits to the destination device a last known version number of the music database that was synced to the destination device and a current version number of the media database at the source device. In response to a failure of the network connection before completion of the metadata sync operation, upon establishment of a second network connection between the source device and destination device, the metadata sync is completed only for any version numbers that indicate a version subsequent to the last version number that was synchronized over the first network connection.

24 Claims, 12 Drawing Sheets

WIRELESS CONTENT SYNCHRONIZATION

CROSS-REFERENCES TO RELATED APPLICATIONS

The present application claims the benefit of U.S. Provisional Application No. 62/004,698 filed May 29, 2014 entitled "Wireless Content Synchronization," by Weinberger, et al. (Ref. No. P23316USP1), which is hereby incorporated by reference for all purposes.

BACKGROUND

Portable devices frequently have the ability to play media content items, comprising content items such as songs, movies, video clips, documentaries, and the like. Devices with such playback capabilities can include wireless telephones, media players, tablet computers, wearable computing devices, and the like. A corresponding library database includes the content items themselves, as well as metadata that identifies each content item in the library. Typically, a user has a library of content items, which can be propagated to corresponding libraries in other devices in a synchronization ("sync") operation, so that the library databases of the user's various devices are synchronized. For example, a user may have an "iTunes" media library on a computer device acting as a host, and may sync that "iTunes" media library with an associated smaller, local media library on mobile devices, such as the user's "iPhone" device and "iPad" device. Most library sync operations are performed wirelessly between the user's host media library (e.g., iTunes library) and the local library of each portable device.

Some users may have a media content item library database that is quite extensive, with tens of thousands of content items. Larger library databases require more time to complete the sync operation than smaller library databases. Performing a wireless sync operation between the host media library database and the local library database of each portable device can be problematic, due to poor connections over the wireless communication channel or due to user interruption. An interruption in any stage of the sync process can require the entire sync operation to be performed anew, once the wireless connection has been re-established.

Some systems utilize a two-phase sync operation, in which metadata is synced first, followed by sync of media content items. Each time a user makes a change to the system media library on a device and completes the change session to save the changes to the library database, such as by adding a song or editing a note for a content item, the system assigns a version number to the media content item library database. That is, when the changed media content item library database is saved, its corresponding version number is incremented. The changes in a media content item library database generally comprise two types of data: metadata, which refers to data about the media content items, and the media content items themselves, such as songs, movies, images, and the like. For example, metadata about a song can include song title, song artist, album, music genre, play count, year of song's release, and the like. The song itself (i.e., the audio file) is data that comprises the media content. Metadata changes that will be synced are typically of smaller file size than corresponding media content item changes that will be synced. For example, adding a song to a media content item library entails adding the audio file comprising the media content item, and adding the song title, artist, and the like to the media content item library database, comprising the metadata.

Using a two-phase sync usually increases the likelihood that the metadata sync portion can be completed without incident, ensuring the entire file of metadata changes is successfully updated, so that only the second phase, the media content sync, must be completed. Nevertheless, with the increasing size of many user libraries, a two-phase sync operation may still be vulnerable to poor wireless connections and interruptions. For example, given the increased size of some user metadata files, connection interruptions may still occur in the middle of the metadata sync operation, in response to which the sync operation may have to be repeated in its entirety upon the re-establishment of the wireless channel connection.

Although success of the two-phase media content sync portion is increased over most single-phase sync operations, it is desirable to provide new techniques to increase the likelihood of a successful sync,

BRIEF SUMMARY

Embodiments of the present invention provide systems, methods, and apparatuses for performing a sync operation involving metadata change files and content item change files between two media content item library databases. Embodiments can reduce the amount of data that must be synced to perform a media content item sync operation over a wireless connection to increase the likelihood of a successful sync in a minimum of time. For example, a source device can be synchronized to a destination device over a network connection in a two-phase arrangement, synchronizing first in a metadata sync operation and then in a media content sync operation. The metadata change file specifies the media content that has changed and that should be copied for synchronization purposes. The source device may comprise, for example, a device that stores a media content item library, and the destination device may comprise, for example, a portable media device, such as a wearable device, a smartphone device, a tablet computer, a laptop computer, a desktop computer, or the like that contains a local media library that is typically a subset of the media library. The source device can be a similar device as the destination device. Sync operations are generally bidirectional, so that each device is synced with the other. For purposes of description, for any two devices that are being synced, the description herein will describe the operation with one device characterized as the source device and the other device characterized as the destination device, but it should be understood that the roles will later be reversed, to complete the sync operation between the two devices.

In a metadata sync operation, the source device can transmit to the destination device a last known version number of its media library database as synced to the destination device, and a current version number of the media library database as currently existing at the source device. The destination device knows similar version number information for its library databases. In a typical sync operation, multiple versions of respective library databases will be synced between two devices. For the two-phase sync operation, a sync log is kept for each device as the metadata sync proceeds, with the version number of the current metadata sync being incremented as each metadata version is synced. If desired, the sync need not be in numerical order of version numbers, so long as the sync log reflects the version numbers successfully synced. In response to a failure of the network connection before completion of the metadata phase of the sync operation, upon establishment of a second network connection between the source device and destination device, the metadata sync can be completed only for metadata items that have a version number that indicates a version subsequent to the last version number that was successfully synchronized over the first network connection. References herein to the "media library" generally shall be understood to also refer to the media content item library database.

During a media content sync operation, the second phase of the two-phase sync, media content specified in the synchronized metadata as one or more media lists to be synchronized can be handled such that the destination device determines if any content items in the media list have been changed in version number and, in response, synchronizes the changed content items. The destination device can determine if any media content item is associated with a changed content item and, in response, can provide the source device with any resource limitations, e.g., such that the source device processes the associated media content item in accordance with the resource limitations before synchronizing media content item with the destination device. The destination device can determine if any content item in the media list selected for asset synchronization is not stored in the source device or stored locally in the destination device. And, in response, the destination device can obtain the not-stored content item from a network source and store the content item locally in the destination device library database.

Other embodiments are directed to systems, portable consumer devices, and computer readable media associated with methods described herein.

A better understanding of the nature and advantages of embodiments of the present invention may be gained with reference to the following detailed description and the accompanying drawings.

DETAILED DESCRIPTION

Figure 1:
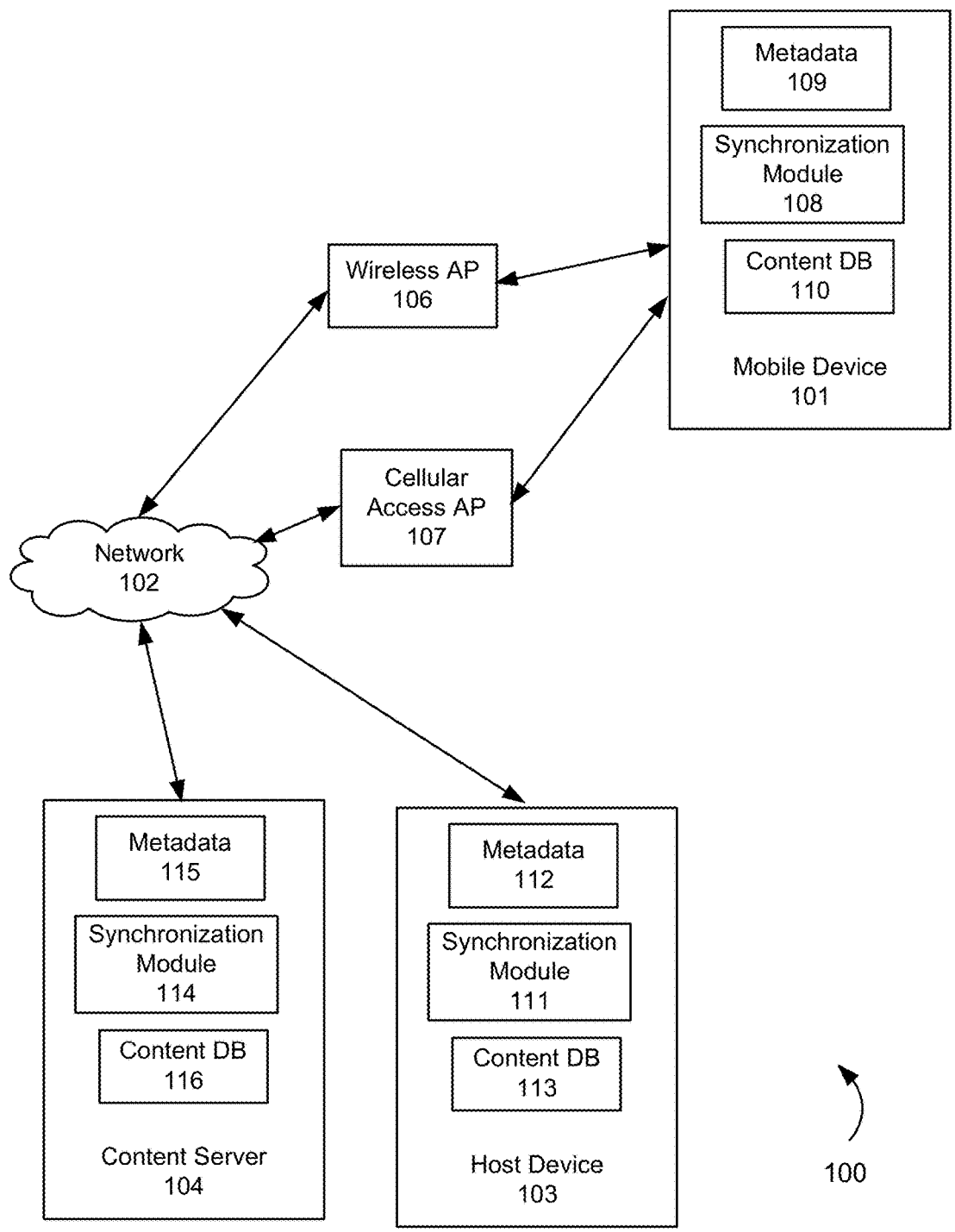
FIG. 1 is a block diagram of a system that performs media database synchronization across devices, according to embodiments of the present invention.

In accordance with embodiments of the invention, a source device is synchronized to a destination device over a network connection in a two-phase arrangement, synchronizing first in a metadata sync operation with a metadata change file and then in a media content item sync operation with a media content item change file. In the metadata sync operation, the source device transmits to the destination device a last known version number of the media library that was synced to the destination device, and the version number of its own media library, as well as the metadata change file. The metadata files with changes typically include multiple metadata change data version numbers, typically one version number per change session or content item library database save operation. Each metadata version number may contain data relating to multiple changes to content items. Thus, typically multiple metadata change version numbers will be involved in a sync operation. It should be apparent that the destination device knows its own version number for its media library. The sync operation typically proceeds sequentially, such that a metadata version with a lower number is synced before a metadata with a higher number version.

If there is a failure of the network connection before all the respective metadata versions are mutually updated between the two devices, it is likely that one of the metadata versions will have been copied to the other device only partially, such that the preceding version number metadata will comprise a last successfully completed metadata version. In response to such a failure of the network connection before completion of the entire metadata sync operation, upon establishment of a second network connection between the two devices, the metadata sync operation will be completed only for any version numbers that indicate a version subsequent to the last version number that was successfully synchronized over the first network connection. That is, assuming sync was being conducted such that changes were sent from the source device to the destination device, the sync operation will resume beginning with the metadata version number that was only partially completed. During the second phase of the two-phase sync (the media content sync phase), the media content specified in the synchronized metadata as one or more media lists to be synchronized are handled such that the destination device determines if any content items in the media list have been changed in version number and, in response, the destination device obtains the changed content items for sync.

In the description herein, it will be understood that sync operations between two devices are bidirectional, each device syncing with the other, but for convenience of description, for any two devices characterized as participating in a sync operation, one device will be referred to as the source device, and the other device will be referred to as the destination device. It should be understood that the two devices will reverse roles to complete the sync operation, so that the sync operations described with respect to one of the two devices as source and the other as destination will be understood to also apply to the other of the two devices, reversing roles, to provide a bidirectional sync.

I. Synchronize Operation

FIG. 1 is a block diagram of a system 100 that performs media database synchronization across two devices, according to embodiments of the present invention. In FIG. 1, a system 100 includes a mobile device 101 communicatively coupled to content servers 103-104 over a network 102. The mobile device 101 may be any kind of portable device such as, for example, a laptop, a tablet, a mobile phone (e.g., a Smartphone), a media player, a personal digital assistant (PDA), a gaming device, and the like. For example, the mobile device 101 may be an "iPhone" or "iPod" device available from Apple Inc. of Cupertino, Calif., USA. The network 102 may be any kind of network such as, for example, a local area network (LAN), a wide area network (WAN) such as the Internet, or a combination thereof.

The content servers 103-104 may be any kind of server such as content distribution servers, which may be implemented as part of a cloud installation or server farms, or may be any kind of host device from which media content may be received. For example, the servers 103-104 may be part of an "iTunes Appstore" service available from Apple Inc., or may be a laptop computer or desktop computer that stores a host media library with which the mobile device is synced. In the description herein, the media content servers may be interchangeably referred to as the "host device" or "source device".

In one embodiment, the mobile device 101 can communicate with the servers 103-104 over a wireless network via a wireless access point (AP) 106. For example, the mobile device 101 can communicate with the servers 103-104 via a WiFi network provided by a WiFi hub or hotspot, for example, for the purpose of content synchronization. Furthermore, if the mobile device 101 includes a cellular communication capability (e.g., a mobile phone or Smartphone), then the mobile device 101 can also communicate with the servers 103-104 over a cellular network, for example, for the purpose of content synchronization. In addition, if desired, the device 101 can also communicate with a hardwired connection for the purpose of content. Throughout the description herein, the term "media content" or "content item" may refer to any payload data, such as music, video, or multimedia content (e.g., songs or movies), applications to be installed, or other data files (e.g., documents), and the like.

In one embodiment, the mobile device 101 includes a synchronization module 108 to synchronize content with a remote node. For example, the synchronization module 108 can communicate with a synchronization module 111 of the host 103 for content synchronization between the mobile device 101 and the host 103. Alternatively, the synchronization module 108 can communicate with a synchronization module 114 of the server 104 for content synchronization between the mobile device 101 and the server 104, which may be performed via the wireless AP 106 and/or cellular AP 107.

For the purpose of illustration only, the mobile device 101 can attempt to synchronize content with the content server 103 over the network 102. In one embodiment, the content synchronization is performed in a two-phase operation. During a first phase, the synchronization module 108 of the mobile device 101 can communicate with the synchronization module 111 of the host device 103 to synchronize metadata 109 and 112, respectively. The metadata describes content such as media content 110, 113 to be synchronized in a subsequent media content sync phase. Subsequently, the actual content is synchronized between the mobile device 101 and the host device 103, for example, over different periods of time and/or different network connections.

The metadata in general has a relatively smaller size as compared to the media content, and therefore it can be synchronized in a shorter period of time. That is, the metadata is more likely to be synchronized without interruption. Nevertheless, the actual media content to be synchronized could have a larger size of payload. For example, a movie file may have a larger size and it may take a longer time to download from the host device 103 to the mobile device 101, or vice versa.

In one embodiment, the actual content can be synchronized in multiple portions or segments during the subsequent phase or phases of content synchronization, based on the metadata. That is, once the metadata has been synchronized, the actual content can be broken up in multiple segments and individually synchronized over multiple periods of time without having to continuously synchronize the entire content. For example, an album by an artist may include segments that comprise individual songs. This is very useful when the content file is large and the connection, particularly a wireless connection, to the remote node may be lost during the synchronization. During the content synchronization, if the connection is lost, the synchronization can be subsequently picked up during a subsequent connection session based on the metadata, without having to restart the entire synchronization.

According to one embodiment, once the metadata has been synchronized, a user of the device can start to interact with at least a portion of the content. For example, the user can view at least some of the music tracks being synchronized, or to be synchronized. A graphical representation (e.g., icon or different colors) may be utilized to indicate that the content has not been completely synchronized. For example, a music track that has not been completely transferred may be displayed in gray with a progress indicator indicating that the content synchronization for the associated music is being performed. According to a further embodiment, content to be synchronized may be prioritized, for example, based on size, type, or user specific configuration. For example, content with a smaller size may be synchronized prior to those with larger sizes.

Figure 2:
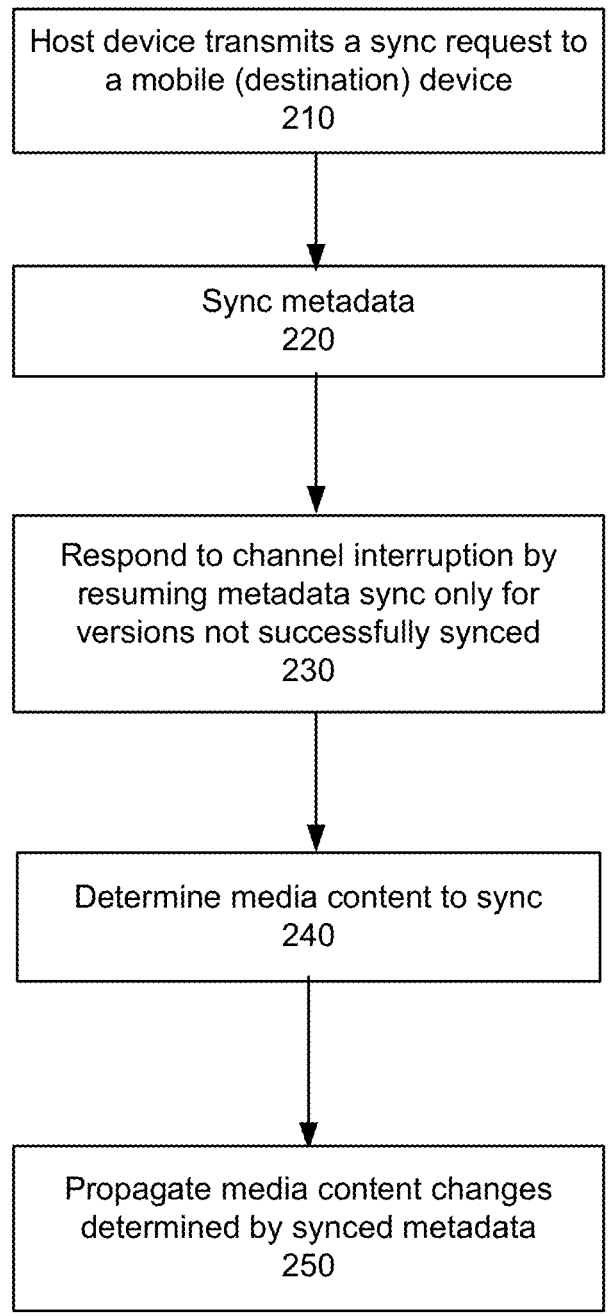
FIG. 2 is a flowchart of a method for media database synchronization, according to embodiments of the present invention.

FIG. 2 is a flowchart of a method 200 for media database synchronization, according to embodiments of the present invention. The sync operation can be performed such that changes to a media library database at a mobile device are sent to a host device, and changes to a media library database at the host device are sent to the mobile device. The sync operation described herein is a two-phase sync operation. As described further below, a metadata sync operation in accordance with embodiments of the invention can sync the metadata changes between the two devices. For the description that follows, the mobile device will be characterized as the destination device.

At the block 210, when the mobile device is communicatively coupled to the host device, the host device transmits a sync request to the mobile device over a communications channel. Sending the sync request may be implemented according to conventional techniques.

At the block 220, the mobile device 101 and the host device 103 synchronize the metadata. The metadata may include, for example: purchasing data for purchasing or downloading an item (e.g., an application), a list of media assets stored in the mobile device 101, user edits to the content database on the mobile device 101 (e.g., playlist, skip, play count), deletion of media content (e.g., deletion of a song, or movie), graphics user interface (GUI) settings (e.g., icon order or arrangement), installed application(s), previous synchronization status, and the like. Examples of metadata can also include library data such as artist names, album names, song titles, or collection information such as playlists and their associated tracks, asset version, and encoding information.

At the block 230, the metadata sync is performed so that interruptions that occur to the communications channel during the metadata sync can be recovered from without repeating the entire metadata sync operation. The metadata files with changes typically include multiple metadata change data version numbers, typically one version number per change session or content item library database save operation. Each metadata version number may contain data relating to multiple changes to content items. Thus, typically multiple metadata change version numbers will be involved in a sync operation. In accordance with embodiments of the invention, recovery from a channel interruption during metadata sync can be achieved by keeping track of the metadata change data version numbers in a log file, updating each current metadata change version number as a successful sync of the change version is completed. A disruption to the communications channel during sync can be overcome by noting the version number that was last successfully synced.

For example, if the metadata changes to be synchronized include version numbers one through ten, and if six of the ten individual metadata versions are successfully completed before the communications channel fails in the midst of synchronizing the seventh metadata version, then once the communications channel is restored, the metadata sync can resume with the seventh metadata version, because versions one through six have already been successfully synced. It should be noted that, under conventional operation, the entire metadata sync operation would be repeated, because under conventional operation, neither device being synced has the ability to track successfully completed sync versions, version-by-version, and neither device has the ability to resume metadata sync starting from the last successfully completed metadata sync version number.

Once the metadata sync operation has successfully concluded, the media content may be synchronized. The media content to be synced is determined, as indicated by the block diagram box 240. The metadata received in the metadata sync operation is recognized by the respective devices 101, 103, 104 as specifying media content to be synced. Sync of the media content may start automatically without user intervention or user knowledge, depending upon the operating condition at the time of content sync. For example, if connection between the mobile device 101 and host 105 is still available after the conclusion of the metadata sync operation, the media content sync operation can start immediately, without interruption or delay. In response to the specification of media content to be synced, the media content changes are propagated between the devices, as indicated by the diagram block 250. As described further below, the media content sync can be performed so as to reduce the amount of information that must be transferred to the devices.

II. Surviving Interruption in Metadata Sync

Figure 3:
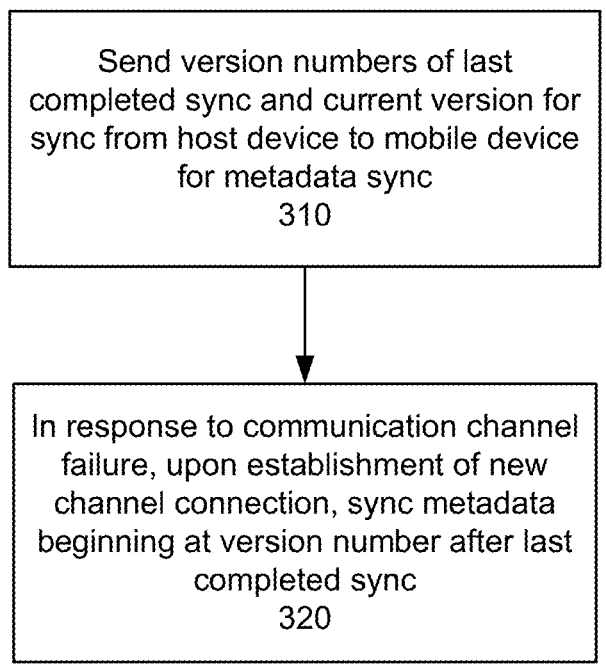
FIG. 3 is a flowchart of a method for metadata sync in response to an interruption in the wireless connection between two devices, according to embodiments of the present invention.

FIG. 3 is a flowchart that provides details of the block 230 operation to respond to an interruption in the communications channel during metadata sync. It should be noted that, in a conventional two-phase sync, an interruption to the communication channel during metadata sync can result in the entire operation being repeated once communication is re-established. As noted above, even metadata files can become sufficiently large that communications interruptions in mid-sync can occur. According to embodiments of the invention, the syncing devices can recover from such a communication interruption without repeating the entire metadata sync operation.

In accordance with embodiments of the invention, at the sending of a request for sync between two devices, at the block 310, each respective device will send the version numbers of the last completed database sync between the devices and the current version number of the database for each device. Thus, source device will send the version number of its last metadata sync with the destination device, as well as its own current metadata version number. For example, changes may have been incrementally applied to the database on a respective device, so that a last applied metadata version number might be given as "100" and a current metadata version number might be given as "120". The destination device will do likewise with version numbers for the destination device. The version numbers "100" through "120" comprise a first plurality of version numbers to be synced. Thus, the first plurality can correspond to a difference between the last known version number and the current version number, and each version number in the first plurality of version numbers (100, 101, . . . , 120) can corresponding to a separate change file in metadata of the media library. The difference can be computation that determines versions numbers to be synced.

As the sync operation progresses, the destination device will keep track of successfully propagated change version numbers in a log file. If the metadata sync operation is interrupted, such as due to a communications channel failure, then upon restoration of the communication channel, the destination device will know the last successfully completed version number synced, and in accordance with embodiments of the invention, the destination device will resume the metadata sync operation beginning only with metadata version numbers that are subsequent to the last successfully completed metadata version number, as indicated in the flowchart box 320. The destination device need not repeat the sync for all metadata version numbers, as with a conventional technique. Thus, only uncompleted metadata change versions need be applied upon the restoration of the communication channel.

III. Obtaining Content Items

Figure 4:
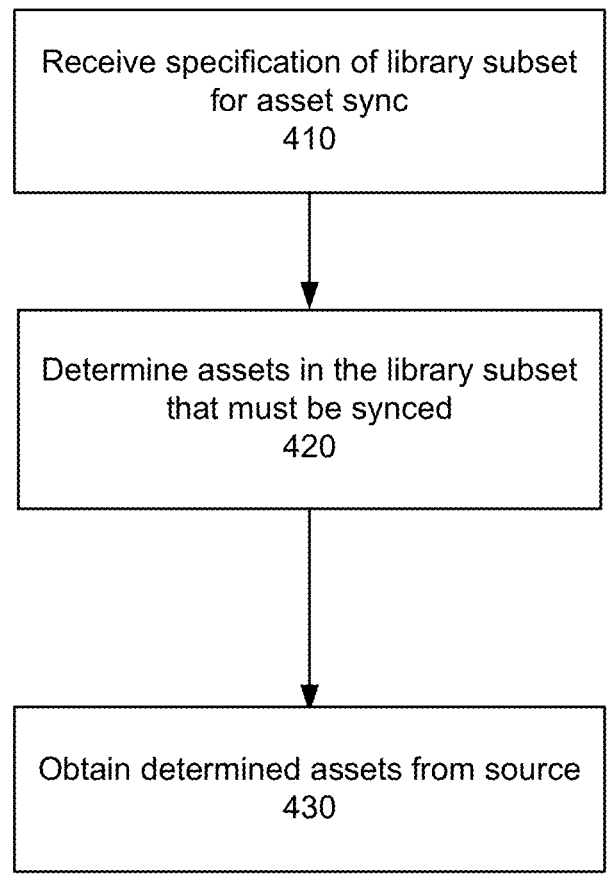
FIG. 4 is a flowchart of a method for direct designation of a library subset for sync, according to embodiments of the present invention.

FIG. 4 is a flowchart of a method for direct designation of a library subset for sync, according to embodiments of the present invention. With the devices 101, 103, 104, a user can directly designate a subset of the media content database for sync, wherein the subset can comprise a specified asset in the database. This feature allows a user to easily reduce the amount of information that will transfer over a sync operation, because the asset specification can comprise a single instance of a database category. For example, a single one of multiple playlists in the media database may be specified for sync. Conventionally, categories may be synced, such as all playlists or all recordings of an artist or all content of a particular genre, but particular, specific assets or media content within those categories cannot be conveniently specified for sync, or a variety of sub-menus must be navigated to implement the desired sync.

Thus, the user interface of the device from which a library subset will be specified supports user designation of the particular subset, or database asset, for sync. That is, the sync of database assets is independent of the sync of libraries. The user will first specify the library subset for the asset sync 410, such as selecting a particular playlist. The destination device that receives the library subset specification will initiate an update and sync operation of all items in the specified asset. In the case of a playlist, for example, the destination device will perform an update and sync of all the items that are on the playlist, in addition to an update and sync of the playlist itself. For example, if a song is added to a playlist and the destination device does not have the song in its library, and if the playlist is specified as a library asset for sync, then the destination device will update the local copy of the playlist that it has, and will also determine that it does not have the song added to the playlist 420. As a result, the destination device will determine that the added song should be obtained, and the destination device will do so, such as by download from a server 430.

IV. Accommodating Resource Limitations

Figure 5:
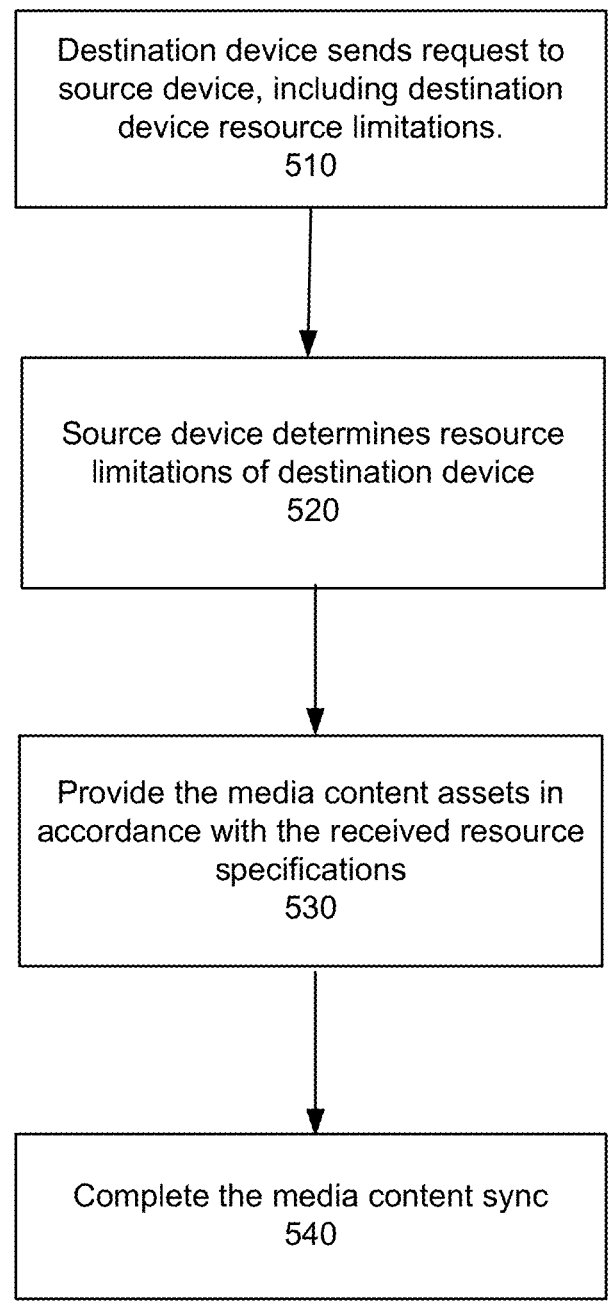
FIG. 5 is a flowchart of a method for sync with accommodation of resource limitations at the destination device, according to embodiments of the present invention.

FIG. 5 is a flowchart of a method for sync with accommodation of resource limitations at the destination device, according to embodiments of the present invention. An operational feature of the devices 101, 103, 104 that helps to reduce the amount of data that must be transferred during the media content sync operation relates to recognition of, and accommodation for, device resource limitations or constraints.

During a media content sync operation, a destination device may determine that it requires a copy of a library database asset from a source device as part of its update operation. For example, a cover art image that goes along with an added music album may be needed by the destination device. In accordance with embodiments of the invention, as indicated at the block diagram 510, the destination device will send a request to the source device for the cover art image, along with specifications for its device resources that may affect the asset to be received, so that the source device may pre-process the asset before sending it. Thus, the source device may receive the request from the destination device for a library asset to be synced.

At block 520, the source device will parse the received request and recognize any resource limitations therein that may affect the ability of the destination device to consume the requested asset. The source device will then process the requested asset so that the information is not substantially greater than needed for the destination device to successfully consume the processed asset. For example, the requested asset might be a cover art image for a music album to be synced, and the request may indicate that the display screen of the destination device has a maximum display resolution of 600 pixels by 800 pixels. If the cover art image stored by the source device has an image size of, for example, 800 pixels by 1200 pixels, then the source device will first recognize the disparity between the image size that it has stored in its library and the ability of the destination device to consume or exploit the stored image, at the block 520.

In response to a recognition that the destination device is constrained in its ability to consume the requested asset, as indicated by the FIG. 5 flowchart block 530, the source device will pre-process the requested asset so that the processed asset will have sufficient information to be successfully utilized by the destination device, without extraneous information that would be substantially greater than needed for the destination device to successfully consume the processed asset. In the cover art image example from above, the source device may pre-process the cover art image before sending it to the destination device so as to reduce the dimensions (and corresponding data size) of the cover art image from 800×1200 pixels to 600×800 pixels before sending. The source device will then send the reduced-size cover art image to the destination device, as indicated by the FIG. 5 flowchart block 540.

V. Pinning a Content Item

Figure 6:
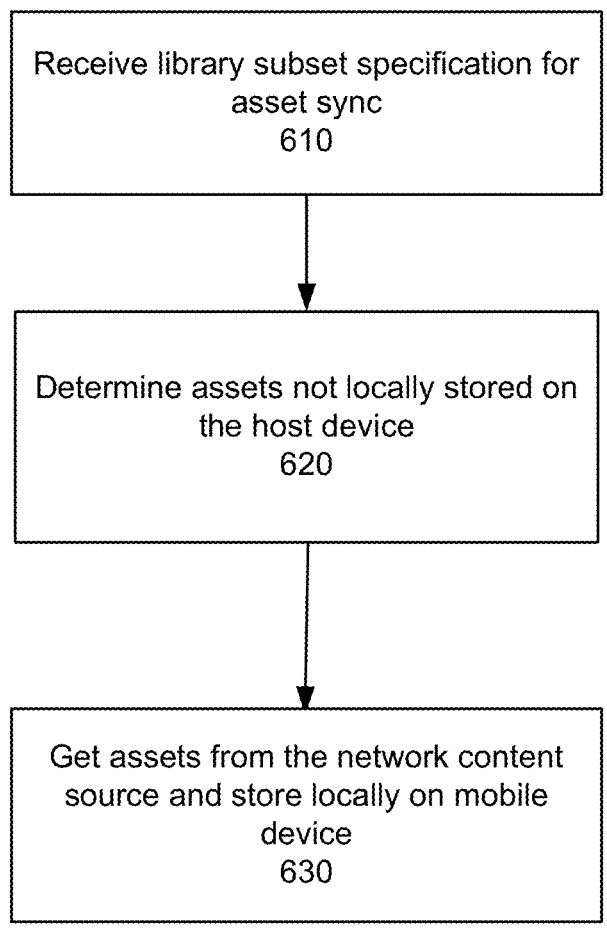
FIG. 6 is a flowchart of a method for pinning a content item to a local library for an item that is otherwise only available with a network connection, according to embodiments of the present invention.

FIG. 6 is a flowchart of a method for pinning a content item to a local library for an item that is otherwise only available with a network connection, according to embodiments of the present invention. An operational feature of the devices 101, 103, 104 for user convenience is to determine library assets that are not stored at a source device with which a destination device is to be synced, and to obtain such missing assets and provide them to the destination device for local storage. This improves the user experience for consuming the asset, such as for playback, because the user, upon selecting playback of the asset, is not forced to first download or otherwise obtain that asset before consuming (playing it back). This feature may be characterized as "pinning" an asset, such as a music track, to the destination device, so that after sync the asset will be available locally at the destination device, rather than the destination device being required to obtain the asset from the cloud or content network when it is needed.

For example, a user at a destination device may designate a library subset for sync 610, such as selecting a playlist for sync, as described above in connection with FIG. 4. In response, the devices 101, 103, 104 will operate such that the assets on the playlist that are not locally available will be identified 620. The destination device will be able to identify the missing assets because the destination device will request the assets from the source device, in a system level operation that is conventional, and the destination device receive an indication that the assets are not available from the source device. Such missing assets can then be obtained and stored in the local database library 630. For example, the missing asset can be automatically obtained from a network source, such as a content server from an online store, if the missing asset is not already locally stored. More particularly, a destination device may generate a request for a library subset sync for an asset that is missing, such as a playlist sync for which the source device reports to the destination device that it does not have the asset (music track). That is, the source device obtains the music track from "the cloud" when the track is to be played, for example, it may obtain it through an online listening service such as "iTunes Match" from Apple Inc. or the like. To obviate the need for the destination device to download the music track each time the playlist is selected, the destination device can download the music track and store it locally in the library database at the destination device. It should be noted that, alternatively, the source device may take upon itself the task of obtaining the missing asset and may provide it to the destination device. In that situation, the source device may also store the device in its local database library.

VI. Menu Selection

Figure 7:
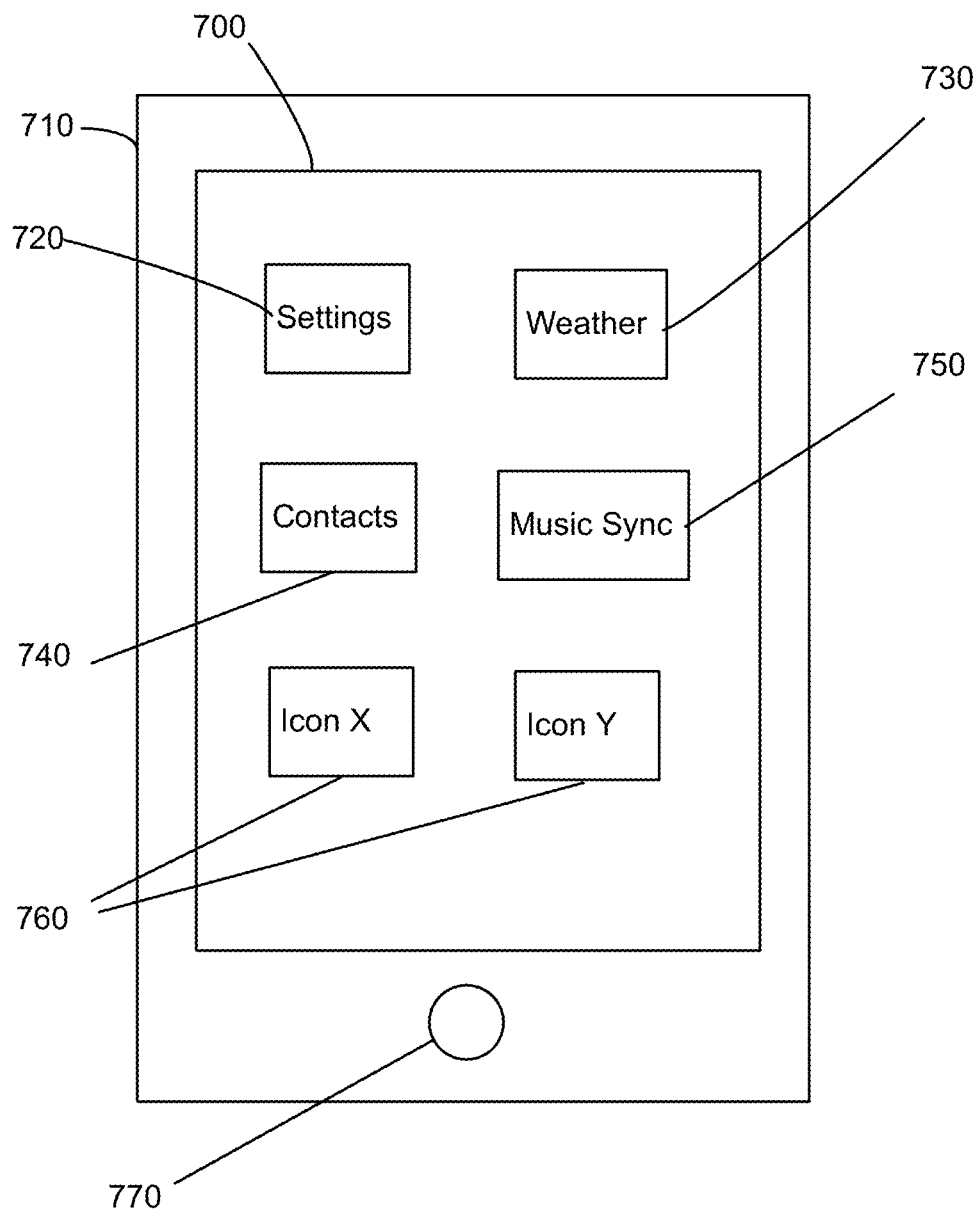
FIG. 7 is a representation of a display screen of a mobile device showing menu choices for system settings, including a "music sync" operation, according to embodiments of the present invention.

FIG. 7 is a representation of a touchscreen display 700 of an electronic device 710, such as one of the devices 101, 103, 104, showing menu choices for system settings, including a "music sync" operation, according to embodiments of the present invention. The display screen 700 is a touchscreen display that shows icons that may be selected by pressing or touching the desired icon. FIG. 7 shows that the menu display may include, for example, icons for General Settings 720, for a Weather application 730, a Contacts application 740, and for Music Sync settings 750. Additional applications and/or settings for selection are collectively represented 760 by the icons Icon X and Icon Y. The device 710 includes a home button 770 that provides a physical "home" button that may be pressed to return to a top-most screen display level. Selection of an item 720, 730, 740, 750, 760 may be implemented by the user tapping the selected item on the touchscreen display 700.

FIG. 7 shows the Music Sync selection icon 750 that a user may select to initiate an input process by which the user selects a library subset, such as a playlist, for sync. Thus, it is not necessary for the user to navigate to a library setup display for the mobile device and then manually select a particular asset within the library for sync, an operation that may require navigation through several levels of an application and moving among various display windows. Instead, the FIG. 7 menu simplifies the operation that a user performs to request sync of a library subset comprising a single asset.

Figure 8:
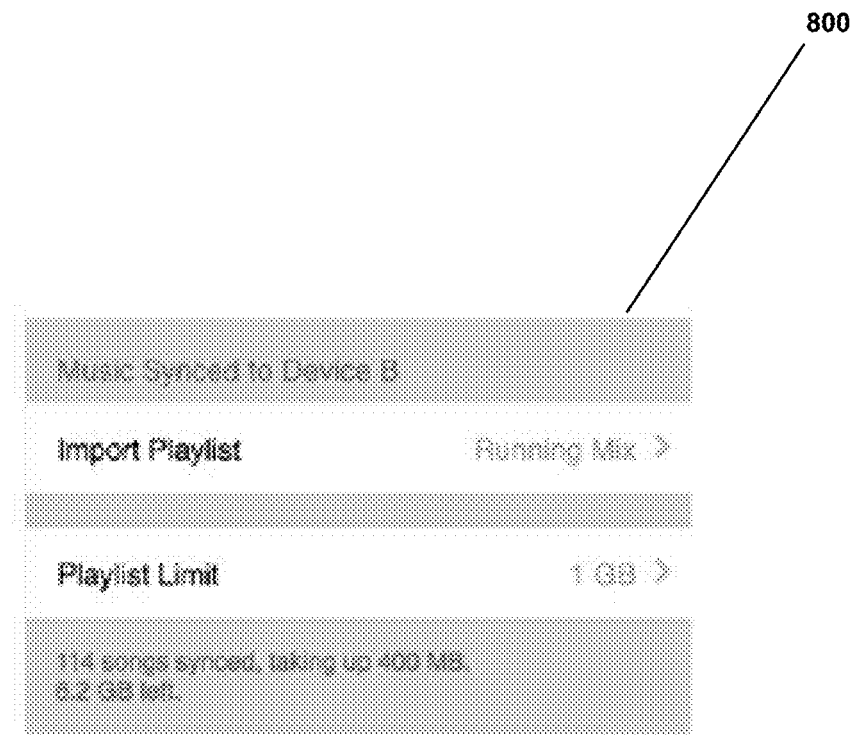
FIG. 8 is a representation of a display screen of a mobile device showing sub-menu choices for the music sync operation, according to embodiments of the present invention.

FIG. 8 shows a screen display 800 that is generated by the device 710 when the Music Sync icon 750 is selected. The screen display 800 provides an overview of the music sync settings and the current sync state. The display 800 illustrates two options for selection by the user, an "Import Playlist" option and a "Playlist Limit" option. The "Import Playlist" option indicates that the playlist "Running Mix" was previously selected in the last sync operation.

Figure 9:
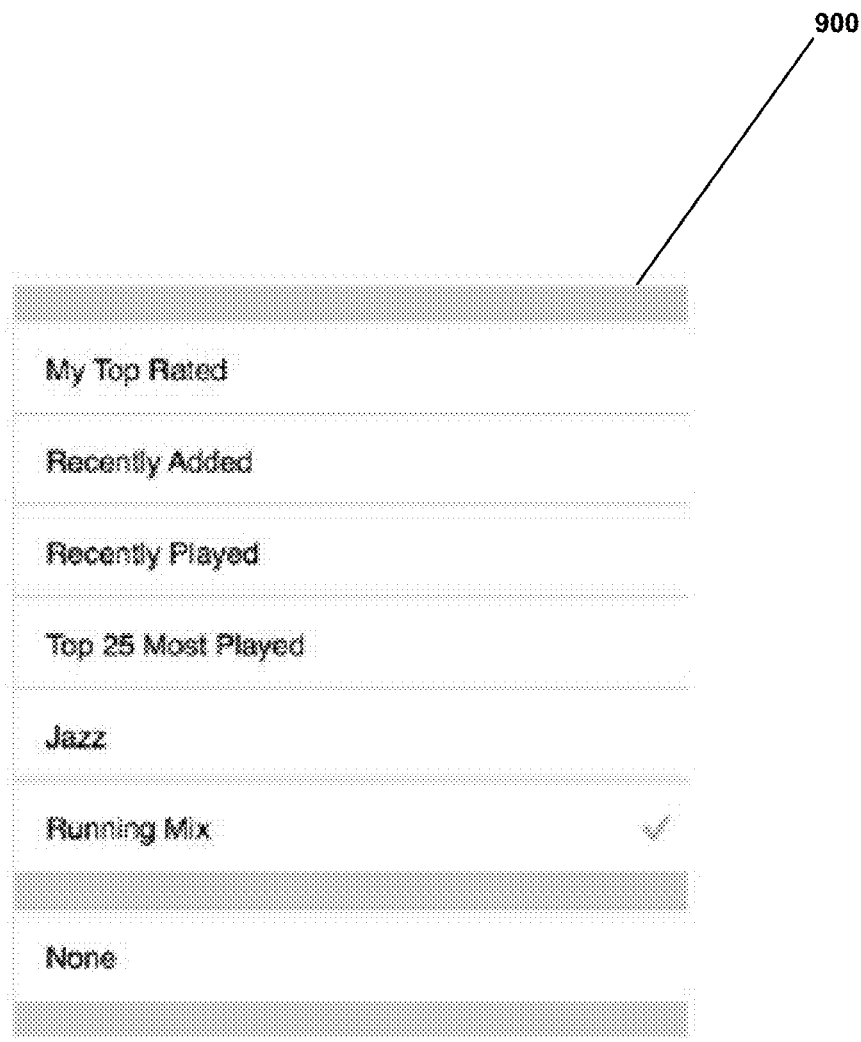
FIG. 9 is a representation of a display screen of a mobile device showing sub-menu choices for the music sync operation, according to embodiments of the present invention.

FIG. 9 shows a screen display 900 that is generated by the device 710 when the "Import Playlist" option is selected from the previous display 800 of FIG. 8. That is, in response to the user selecting the "Import Playlist" icon of FIG. 8, the device 710 generates the FIG. 9 screenshot 900, which shows the selected asset sync playlist from a list of available playlists (or the display 900 will show "None", if there was no selection of a playlist).

Figure 10:
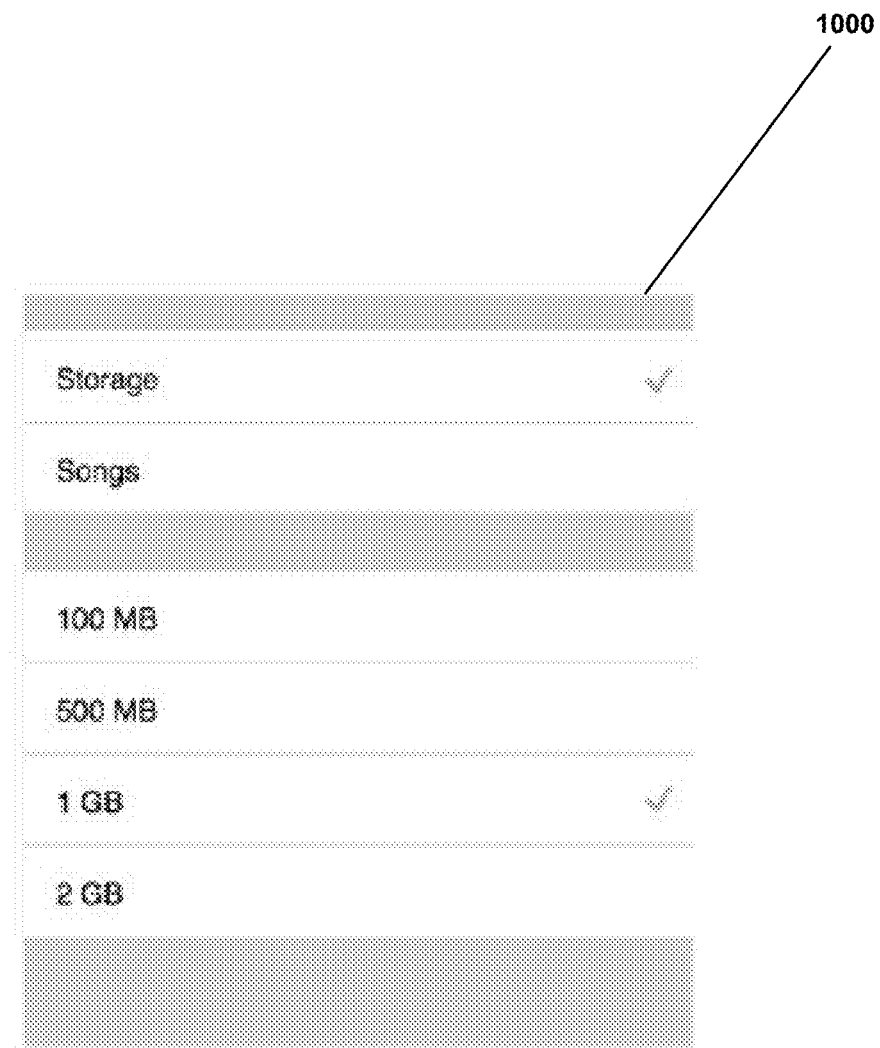
FIG. 10 is a representation of a display screen of a mobile device showing sub-menu choices for the music sync operation, according to embodiments of the present invention.

FIG. 10 shows a screen display 1000 that is generated by the device 710 when the "Playlist Limit" option is selected from the previous display 800 of FIG. 8. More particularly, in response to the user selecting the "Playlist Limit" icon of FIG. 8, the device 710 generates the FIG. 10 screenshot 1000, which shows the limit options of "Storage" and "Songs", and shows that the user has selected "Storage" (indicated by the check mark in the display). In response to selection of "Storage", the device shows the size limit of 1 GB selected by the user for music sync.

Figure 11:
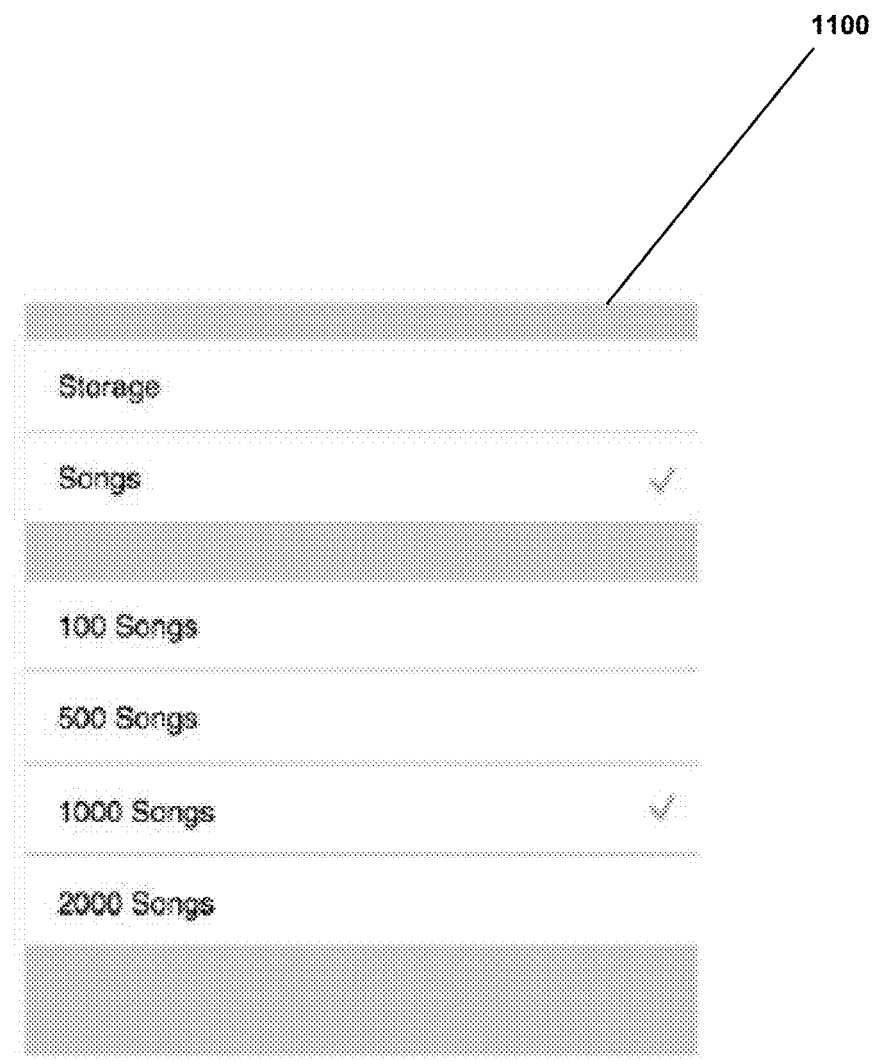
FIG. 11 is a representation of a display screen of a mobile device showing sub-menu choices for the music sync operation, according to embodiments of the present invention.

FIG. 11 shows a screen display 1100 that is generated by the device 710 when the "Playlist Limit" option is selected from the previous display 800 of FIG. 8. More particularly, in response to the user selecting the "Playlist Limit" icon of FIG. 8, the device 710 generates the FIG. 11 screenshot 1100, which shows the limit options of "Storage" and "Songs", and shows that the user has selected "Songs" (indicated by the check mark in the display). In response to selection of "Songs", the device shows the size limit of 1000 songs selected by the user for music sync.

VII. Processing Device

Figure 12:
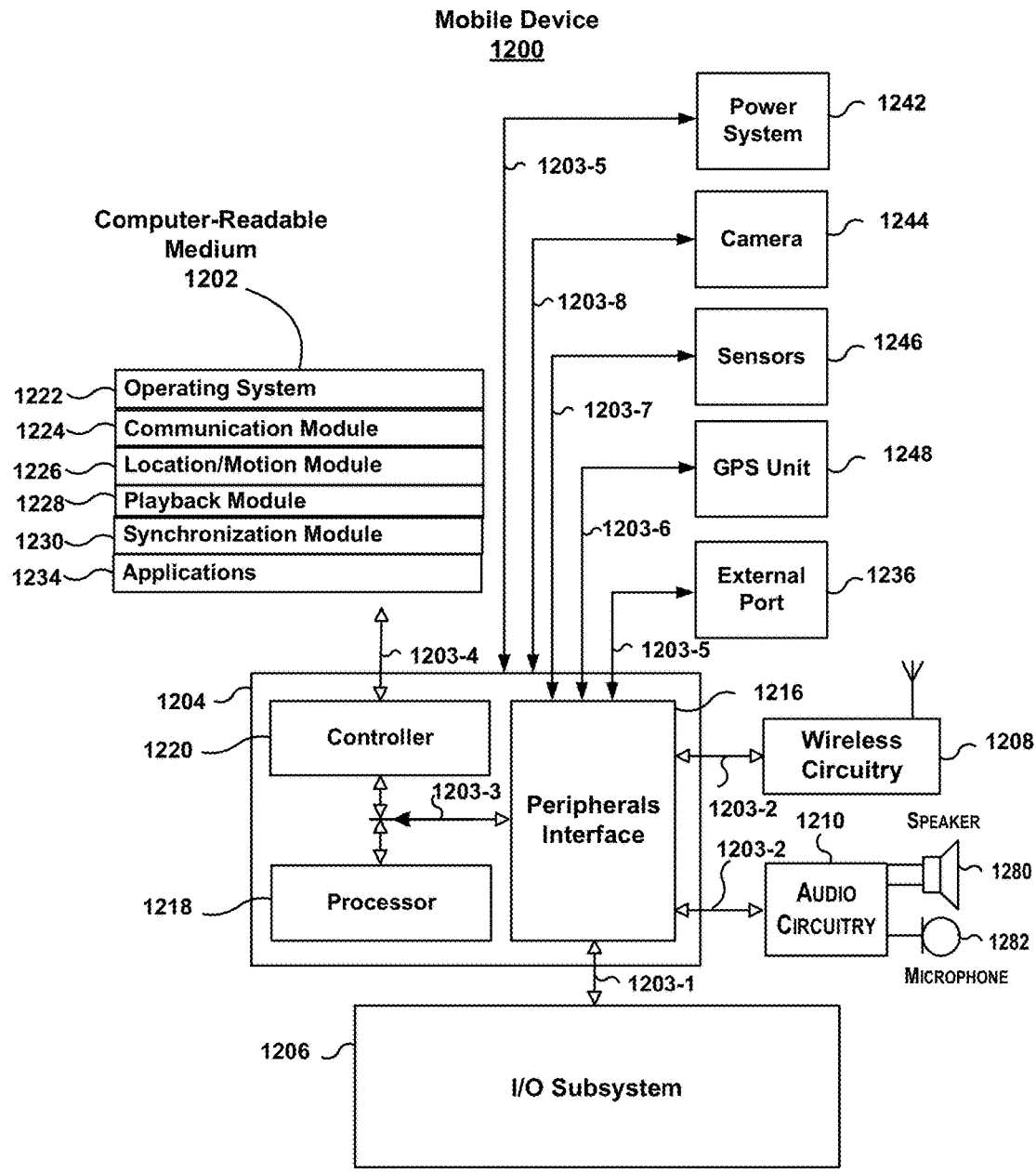
FIG. 12 is a block diagram of a computer processing system that may comprise any of the computing devices and may be used to provide the operation described herein.

FIG. 12 is a block diagram of a data processing system 1200, which may be used with one embodiment of the invention. For example, the system 1200 may be used as part of the mobile device 101 and/or the devices 103, 104 as shown in FIG. 1. The system 1200 generally includes a computer-readable medium 1202, a processing system 1204, an Input/Output (I/O) subsystem 1206, wireless circuitry 1208, and audio circuitry 1210 including a speaker 1280 and a microphone 1252. These components may be coupled by one or more communication buses or signal lines 1203. The device 1200 can be any portable electronic device, including a wearable computer device, a handheld computer, a tablet computer, a mobile phone, laptop computer, tablet device, media player, personal digital assistant (PDA), a key fob, a car key, an access card, a multi-function device, a mobile phone, a portable gaming device, or the like, including a combination of two or more of these items. As examples, a wearable device can comprise a wrist worn device, a device that is clipped or pinned to the user's clothing, a device with a lanyard or chain that is wearable around the user's neck, a headband device, eyeglasses, or any other device that can be secured to the user's person or clothing.

It should be apparent that the architecture shown in FIG. 12 is only one example of an architecture for the mobile device 1200, and that device 1200 can have more or fewer components than shown, or a different configuration of components. The various components shown in FIG. 12 can be implemented in hardware, software, or a combination of both hardware and software, including one or more signal processing and/or application specific integrated circuits.

Wireless circuitry 1208 is used to send and receive information over a wireless link or network to one or more other devices' conventional circuitry such as an antenna system, an RF transceiver, one or more amplifiers, a tuner, one or more oscillators, a digital signal processor, a CODEC chipset, memory, etc. In some embodiments, the wireless circuitry 1208 is capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, WiFi (such as IEEE 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol, including communication protocols not yet developed as of the filing date of this document. A mobile device can include wireless circuitry that can communicate over several different types of wireless networks depending on the range required for the communication. For example, a short-range wireless transceiver (e.g., Bluetooth), a medium-range wireless transceiver (e.g., WiFi), and/or a long range wireless transceiver (e.g., GSM/GPRS, UMTS, CDMA2000 1×/EV-DO and LTE/LTE-Advanced) can be used depending on the type of communication or the range of the communication.

The wireless circuitry 1208 is coupled to a processing system 1204 via a peripherals interface 1216. The interface 1216 can include conventional components for establishing and maintaining communication between peripherals and the processing system 1204. Voice and data information received by the wireless circuitry 1208 (e.g., in speech recognition or voice command applications) is sent to one or more processors 1218 via the peripherals interface 1216. One or more processors 1218 are configurable to process various data formats for one or more application programs 1234 stored on the medium 1202.

The peripherals interface 1216 couples the input and output peripherals of the device to a processor 1218 and the computer-readable medium 1202. One or more processors 1218 communicate with the computer-readable medium 1202 via a memory controller 1220. The computer-readable medium 1202 can be any device or medium that can store code and/or data for use by one or more processors 1218. The medium 1202 can include a memory hierarchy, including cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). In some embodiments, the peripherals interface 1216, one or more processors 1218, and the memory controller 1220 can be implemented on a single chip, such as processing system 1204. In some other embodiments, they can be implemented on separate chips.

The mobile device 1200 also includes a power system 1242 for powering the various hardware components. The power system 1242 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, the mobile device 1200 includes a camera 1244. In some embodiments, the mobile device 1200 includes sensors 1246. The sensors can include accelerometers, compass, gyrometer, pressure sensors, audio sensors, light sensors, barometers, and the like. The sensors 1246 can be used to sense location aspects, such as auditory or light signatures of a location.

In some embodiments, the mobile device 1200 can include a GPS receiver, sometimes referred to as a GPS unit 1248. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 1218 run various software components stored in the medium 1202 to perform various functions for the device 1200. In some embodiments, the software components include an operating system 1222, a communication module (or set of instructions) 1224, a location module (or set of instructions) 1226, a playback app 1228, a synchronization module 1230, and other applications (or sets of instructions) 1234, such as a navigation app.

The operating system 1222 can be any suitable operating system, including iOS, Mac OS, Darwin, RTXC, LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components.

The communication module 1224 facilitates communication with other devices over one or more external ports 1236 or via the wireless circuitry 1208 and includes various software components for handling data received from the wireless circuitry 1208 and/or external port 1236. The external port 1236 (e.g., USB, FireWire, Lightning connector, 30-pin connector, etc.) is adapted for coupling directly to other devices or indirectly over a network (e.g., the Internet, wireless LAN, etc.).

The one or more applications 1234 on the mobile device can include any applications installed on the device 1200, including without limitation, a browser, address book, contact list, email, instant messaging, word processing, keyboard emulation, widgets, JAVA-enabled applications, encryption, digital rights management, voice recognition, voice replication, a music player (which plays back recorded music stored in one or more files, such as MP3 or AAC files), and the like. The one or more applications 1234 can also include a specific app for requesting continuity, controlling playback of content items, updating the content item database, or any other suitable application.

There may be other modules or sets of instructions (not shown), such as a graphics module, a time module, and the like. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

The I/O subsystem 1206 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, the I/O subsystem 1206 can include a display and user input devices such as a keyboard, mouse, and/or trackpad. In some embodiments, the I/O subsystem 1206 can include a touch-sensitive display. A touch-sensitive display can also accept input from the user based on haptic and/or tactile contact. In some embodiments, a touch-sensitive display forms a touch-sensitive surface that accepts user input. The touch-sensitive display/surface (along with any associated modules and/or sets of instructions in the medium 1202) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, the I/O subsystem 1206 can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 1200 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's mobile device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Computer programs incorporating various features of the present invention may be encoded on various computer readable storage media; suitable media include magnetic disk or tape, optical storage media such as compact disk (CD) or DVD (digital versatile disk), flash memory, and the like. Computer readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download.

Although the invention has been described with respect to specific embodiments, it will be appreciated that the invention is intended to cover all modifications and equivalents within the scope of the following claims.

What is claimed is:

1. A method comprising:
   receiving, at a source device, a synchronization request for synchronizing metadata for a media library from the source device to a destination device over a first network connection, wherein the synchronization request includes a last known version number of the media library that was synced to the destination device and a current version number of the media library at the source device so that metadata from the source device to be synchronized with a destination device can be identified based on the last known version number of the media library that was synced to the destination device and the current version number of the media library at the source device;
   identifying a first plurality of version numbers to be synced, the first plurality corresponding to a difference between the last known version number and the current version number, each version number in the first plurality of version numbers corresponding to a change in metadata of the media library;
   identifying a failure of the first network connection at a time prior to completion of the metadata synchronization;
   establishing a second network connection between the source device and destination device at a time subsequent to the failure of the first network connection;
   determining, at the source device, a last successfully completed version number of the media library metadata synced to the destination device at the time of the identified failure of the first network connection, the last successfully completed version number being one of the first plurality of version numbers;
   identifying a first subset of version numbers of the first plurality whose corresponding metadata has been synced based on the last successfully completed version number;
   synchronizing media library metadata corresponding to a remaining subset of the first plurality of version numbers whose corresponding metadata has not been synced before the identified failure; and
   synchronizing media content of the media library from the source device to the destination device following completion of synchronizing the metadata to the current version number of the media library.

2. The method of claim 1, wherein:
   the synchronized metadata transmitted from the source device specifies one or more media lists to be synchronized, such that the destination device determines if any content items in the media list have been changed in version number and, in response, synchronizes the changed content items, and wherein the destination device determines if any media is associated with a changed content item and, in response, provides the source device with any resource limitations such that the source device processes the associated media in accordance with the resource limitations before synchronizing media content with the destination device; and
   wherein the destination device determines if any content item in the media list selected for asset synchronization is not stored in the source device or is not stored locally in the destination device and, in response, obtains the not stored content item from a network source and stores the obtained content item locally in the destination device.

3. The method of claim 2, wherein the resource limitation relates to display resolution of the destination device.

4. The method of claim 2, wherein the media list comprises a playlist.

5. The method of claim 1, wherein the source device, or the destination device, comprise a wearable computer device.

6. The method of claim 1, further including:
   determining library assets that are not stored at the source device with which the destination device is to be synced; and
   obtaining the determined library assets that are not stored at the source device and providing the determined library assets that are not stored at the source device to the destination device for local storage.

7. The method of claim 1, wherein determining the library assets that are not stored at the source device comprises:
   requesting the library assets by the destination device to the source device; and
   receiving, at the destination device, an indication that the library assets are not available from the source device.

8. An electronic device comprising:
   an input component that receives input from a user;
   one or more processor components coupled to the input component;
   a computer-readable storage medium containing instructions that, when executed by the one or more processors, cause the one or more processors of the electronic device to operate as a source device and to:
   receive, at the source device, a synchronization request for synchronizing metadata for a media library from the source device to a destination device over a first network connection, wherein the synchronization request includes a last known version number of the media library that was synced to the destination device and a current version number of the media library at the source device so that metadata from the source device to be synchronized with a destination device can be identified based on the last known version number of the media library that was synced to the destination device and the current version number of the media library at the source device;

identify a failure of the first network connection at a time prior to completion of the metadata synchronization;

establish a second network connection between the source device and destination device at a time subsequent to the failure of the first network connection;

determine, at the source device, a last successfully completed version number of the media library metadata synced to the destination device at the time of the identified failure of the first network connection;

synchronize media library metadata beginning with a media library version number comprising media library metadata subsequent to the last successfully completed version number; and synchronize media content of the media library from the source device to the destination device following completion of synchronizing the metadata to the current version number of the media library.

9. The electronic device of claim 8, wherein:

the synchronized metadata transmitted from the source device specifies one or more media lists to be synchronized, such that the destination device determines if any content items in the media list have been changed in version number and, in response, synchronizes the changed content items, and wherein the destination device determines if any media is associated with a changed content item and, in response, provides the source device with any resource limitations such that the source device processes the associated media in accordance with the resource limitations before synchronizing media content with the destination device; and wherein the destination device determines if any content item in the media list selected for asset synchronization is not stored in the source device or is not stored locally in the destination device and, in response, obtains the not stored content item from a network source and stores the obtained content item locally in the destination device.

10. The electronic device of claim 9, wherein the resource limitation relates to display resolution of the destination device.

11. The electronic device of claim 9, wherein the media list comprises a playlist.

12. The electronic device of claim 8, wherein the source device, or the destination device, comprises a wearable computing device.

13. The electronic device of claim 8, wherein the electronic device:

determines library assets that are not stored at the source device with which the destination device is to be synced; and obtains the determined library assets that are not stored at the source device and provides the determined library assets that are not stored at the source device to the destination device for local storage.

14. The electronic device of claim 8, wherein determining the library assets that are not stored at the source device comprises:

requesting the library assets by the destination device to the source device; and receiving, at the destination device, an indication that the library assets are not available from the source device.

15. An electronic device comprising:

an input component that receives input from a user;

one or more processor components coupled to the input component;

a computer-readable storage medium containing instructions that, when executed by the one or more processors, cause the one or more processors of the electronic device to operate as a source device and to:

transmit, from a destination device to the source device, a synchronization request for synchronizing metadata for a media library from the source device to a destination device over a first network connection, wherein the synchronization request includes a last known version number of the media library that was synced to the destination device and a current version number of the media library at the source device so that metadata from the source device to be synchronized with a destination device can be identified based on the last known version number of the media library that was synced to the destination device and the current version number of the media library at the source device;

identify a failure of the first network connection at a time prior to completion of the metadata synchronization;

establish a second network connection between the source device and destination device at a time subsequent to the failure of the first network connection;

synchronize media library metadata beginning with a media library version number comprising media library metadata subsequent to a last successfully completed version number of the media library metadata synced to the destination device at the time of the identified failure of the first network connection; and synchronize media content of the media library from the source device to the destination device following completion of synchronizing the metadata to the current version number of the media library.

16. The electronic device of claim 15, wherein:

the synchronized metadata transmitted from the source device specifies one or more media lists to be synchronized, such that the destination device determines if any content items in the media list have been changed in version number and, in response, synchronizes the changed content items, and wherein the destination device determines if any media is associated with a changed content item and, in response, provides the source device with any resource limitations such that the source device processes the associated media in accordance with the resource limitations before synchronizing media content with the destination device; and wherein the destination device determines if any content item in the media list selected for asset synchronization is not stored in the source device or is not stored locally in the destination device and, in response, obtains the not stored content item from a network source and stores the obtained content item locally in the destination device.

17. The electronic device of claim 16, wherein the resource limitation relates to display resolution of the destination device.

18. The electronic device of claim 16, wherein the media list comprises a playlist.

19. The electronic device of claim 15, wherein the source device, or the destination device, comprises a wireless telephone computing device.

20. The electronic device of claim 15, wherein the electronic device:
  determines library assets that are not stored at the source device with which the destination device is to be synced; and
  obtains the determined library assets that are not stored at the source device and provides the determined library assets that are not stored at the source device to the destination device for local storage.

21. The method according to claim 1, wherein the source device includes a first processor and a first memory and the destination devices includes a second processor and a second memory; and
  in response to synchronizing the media content of the media library from the source device to the destination device, storing the media content at the destination device.

22. A method comprising:
  transmitting, from a destination device to a source device, a synchronization request for synchronizing metadata for a media library from the source device to a destination device over a first network connection, wherein the synchronization request includes a last known version number of the media library that was synced to the destination device and a current version number of the media library at the source device so that metadata from the source device to be synchronized with a destination device can be identified based on the last known version number of the media library that was synced to the destination device and the current version number of the media library at the source device;
  identifying a failure of the first network connection at a time prior to completion of the metadata synchronization;
  establishing a second network connection between the source device and destination device at a time subsequent to the failure of the first network connection;
  synchronizing media library metadata beginning with a media library version number comprising media library metadata subsequent to a last successfully completed version number of the media library metadata synced to the destination device at the time of the identified failure of the first network connection; and
  synchronizing media content of the media library from the source device to the destination device following completion of synchronizing the metadata to the current version number of the media library.

23. A non-transitory computer-readable storage medium storing instructions which, when executed by one or more processors, cause the one or more processors to:
  transmit, from a destination device to a source device, a synchronization request for synchronizing metadata for a media library from the source device to a destination device over a first network connection, wherein the synchronization request includes a last known version number of the media library that was synced to the destination device and a current version number of the media library at the source device so that metadata from the source device to be synchronized with a destination device can be identified based on the last known version number of the media library that was synced to the destination device and the current version number of the media library at the source device;
  identify a failure of the first network connection at a time prior to completion of the metadata synchronization;
  establish a second network connection between the source device and destination device at a time subsequent to the failure of the first network connection;
  synchronize media library metadata beginning with a media library version number comprising media library metadata subsequent to a last successfully completed version number of the media library metadata synced to the destination device at the time of the identified failure of the first network connection; and
  synchronize media content of the media library from the source device to the destination device following completion of synchronizing the metadata to the current version number of the media library.

24. A non-transitory computer-readable storage medium storing instructions which, when executed by one or more processors, cause the one or more processors to:
  receive, at a source device, a synchronization request for synchronizing metadata for a media library from the source device to a destination device over a first network connection, wherein the synchronization request includes a last known version number of the media library that was synced to the destination device and a current version number of the media library at the source device so that metadata from the source device to be synchronized with a destination device can be identified based on the last known version number of the media library that was synced to the destination device and the current version number of the media library at the source device;
  identify a first plurality of version numbers to be synced, the first plurality corresponding to a difference between the last known version number and the current version number, each version number in the first plurality of version numbers corresponding to a change in metadata of the media library;
  identify a failure of the first network connection at a time prior to completion of the metadata synchronization;
  establish a second network connection between the source device and destination device at a time subsequent to the failure of the first network connection;
  determine, at the source device, a last successfully completed version number of the media library metadata synced to the destination device at the time of the identified failure of the first network connection, the last successfully completed version number being one of the first plurality of version numbers;
  identify a first subset of version numbers of the first plurality whose corresponding metadata has been synced based on the last successfully completed version number;
  synchronize media library metadata corresponding to a remaining subset of the first plurality of version numbers whose corresponding metadata has not been synced before the identified failure; and
  synchronize media content of the media library from the source device to the destination device following completion of synchronizing the metadata to the current version number of the media library.

* * * * *